United States Patent [19]

Hunziker

[11] Patent Number: 5,467,697

[45] Date of Patent: Nov. 21, 1995

[54] DISPOSABLE CHAFING DISH

[76] Inventor: Hugo Hunziker, 2135 President Pl., Costa Mesa, Calif. 92627

[21] Appl. No.: 324,022

[22] Filed: Oct. 14, 1994

[51] Int. Cl.⁶ ..................................... A47J 27/00
[52] U.S. Cl. ............... 99/449; 99/483; 126/9 A; 126/33; 126/40; 126/377
[58] Field of Search ............... 99/483, 449; 126/258, 126/377, 9 A, 260, 33, 40, 39 E, 39 B, 44, 43

[56] References Cited

U.S. PATENT DOCUMENTS

| | | | |
|---|---|---|---|
| 1,547,200 | 7/1925 | Busch | 126/43 |
| 3,361,126 | 1/1968 | Bloomfield | 126/43 |
| 3,364,844 | 1/1968 | Felske | 99/449 |
| 4,920,873 | 5/1990 | Stevens | 99/449 |
| 5,119,800 | 6/1992 | Roberts et al. | 126/33 |
| 5,287,800 | 2/1994 | Orednick | 99/449 |
| 5,293,859 | 3/1994 | Lisker | 99/449 |

FOREIGN PATENT DOCUMENTS 00878527  4/1920  Germany ................. 126/43

*Primary Examiner*—David Scherbel
*Assistant Examiner*—Reginald L. Alexander
*Attorney, Agent, or Firm*—Blakely, Sokoloff, Taylor & Zafman

[57] ABSTRACT

A chafing dish assembly which contains a pair of rings that support a pair of heating elements located below a water tray. The water tray is elevated above the heating elements by a frame supported by a pair of pivoting legs. Located within the water tray are a pair of food dishes. The heating elements heat the water within the tray, which heats the food within the dishes. The frame has a bent top edge which provides a ledge for the water tray. The rings are cantilevered from the frame so that the weight of the heating elements deflect the rings away from the water tray. The height of the flame and the weight of the heating elements decrease as the fuel within the elements becomes expended. The reduction in the weight of the heating element induces an upward movement of the rings toward the water tray, wherein the smaller flame is moved into closer proximity with the tray to provide a more uniform heating process of the food.

4 Claims, 3 Drawing Sheets

DISPOSABLE CHAFING DISH

BACKGROUND OF THE INVENTION

1. Field of the Invention

The present invention relates to a chafing dish assembly.

2. Description of Related Art

The temperature of food is sometimes maintained at an elevated level by a chafing dish assembly. A conventional chafing dish assembly contains a frame that supports an open flame. The chafing dish tray is typically filled with water that is heated by the flame. Dishes containing food are then placed into the heated water of the tray.

The flame is typically generated by a combusted petroleum based gel within a can that is commonly referred to as "sterno". The flame and heat generated by the sterno typically decrease when the petroleum based gel becomes expended. This may result in an uneven heating temperature of the food items. It would therefore be desirable to provide a chafing dish assembly that provides a more uniform temperature during the life of the heating element. It has also been found that the frame of a conventional chafing dish assembly does not fully support the tray and dishes of the assembly. It would therefore be desirable to provide a chafing dish frame that will fully support the water tray and food dishes of the assembly.

SUMMARY OF THE INVENTION

The present invention is a chafing dish assembly which contains a pair of rings that support a pair of heating elements located below a water tray. The water tray is elevated above the heating elements by a frame supported by a pair of pivoting legs. Located within the water tray are a pair of food dishes. The heating elements heat the water within the tray, which heats the food within the dishes. The frame has a bent top edge which provides a ledge for the water tray. The rings are cantilevered from the frame so that the weight of the heating elements deflect the rings away from the water tray. The height of the flame and the weight of the heating elements decrease as the fuel within the elements becomes expended. The reduction in the weight of the heating element induces an upward movement of the rings toward the water tray, wherein the smaller flame is moved into closer proximity with the tray to provide a more uniform heating process of the food.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
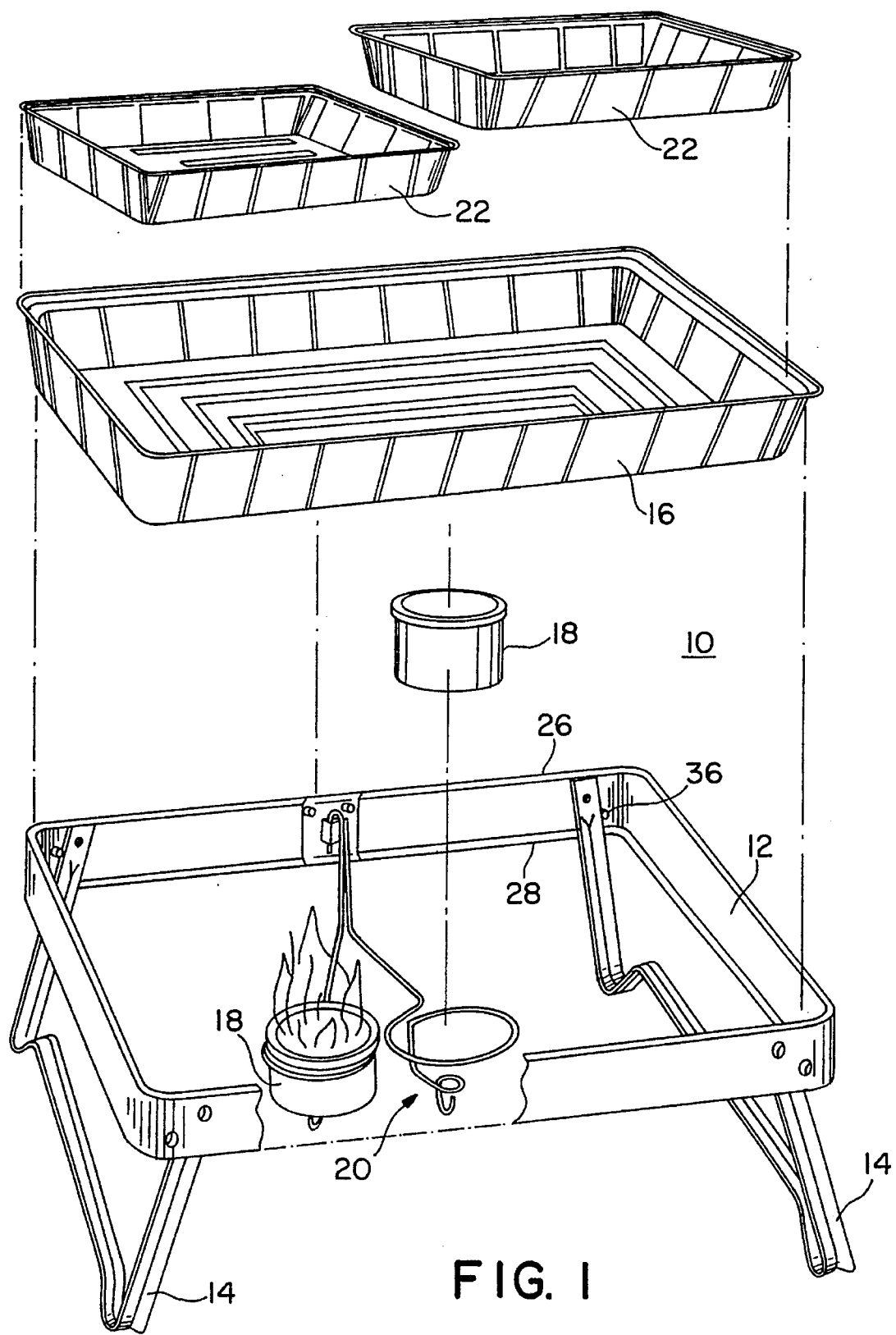
FIG. 1 is a perspective view of a chafing dish assembly of the present invention.
Figure 5:
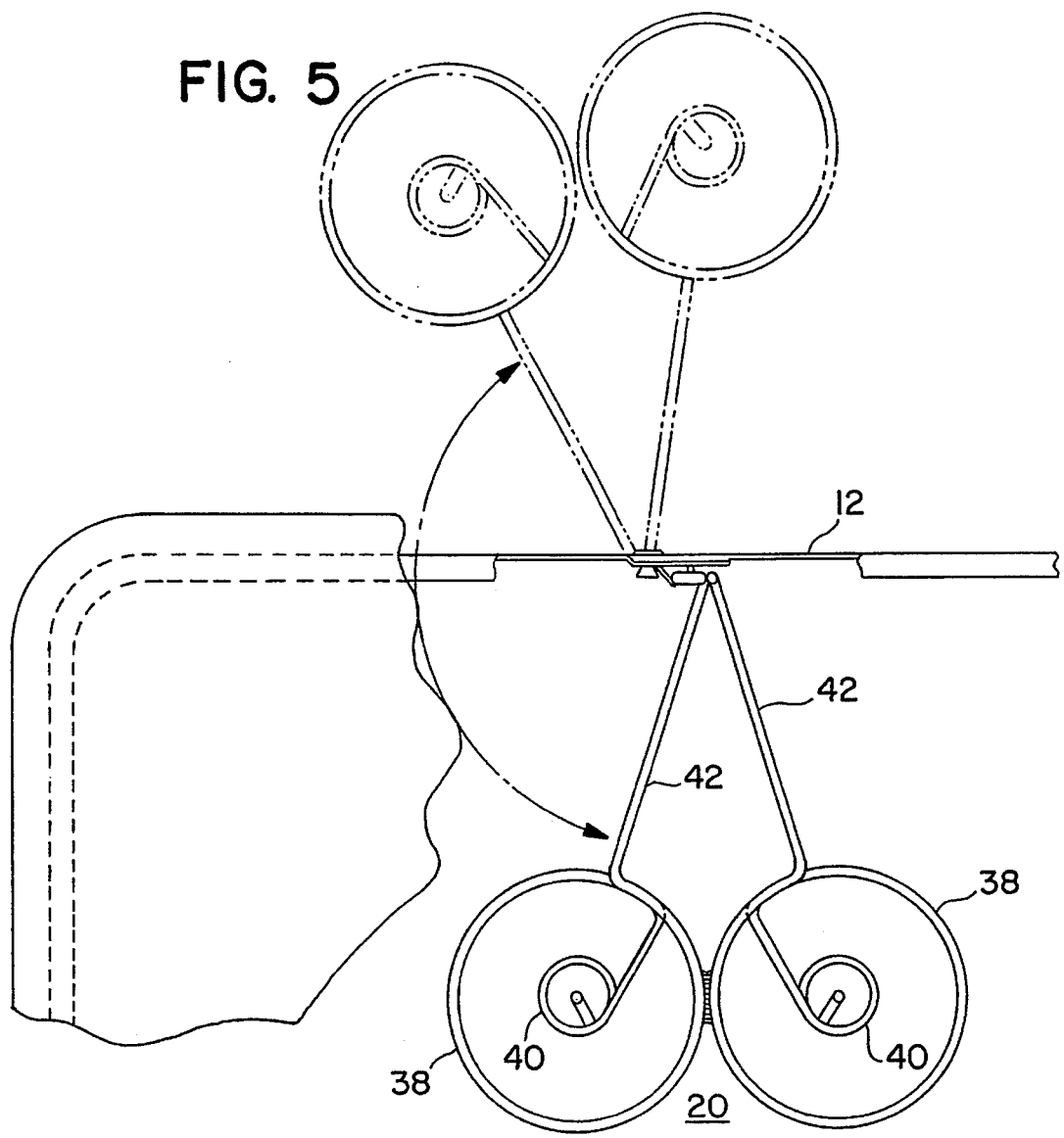
FIG. 5 is a top view showing the ring subassembly rotated relative to the frame.

Referring to the drawings more particularly by reference numbers, FIG. 1 shows a chafing dish assembly 10 of the present invention. The assembly 10 is typically used to heat and maintain the temperature of food. The assembly includes a frame 12 that is supported by a pair of legs 14. The legs 14 elevate a tray 16 above a pair of heating elements 18 supported by a ring subassembly 20 that is pivotally connected to the frame 12. A pair of dishes 22 are typically placed within the tray 16, although it is to be understood that the dishes 22 can be placed onto the frame 12 without the tray 16.

The heating elements 18 typically contain a petroleum based fuel which produces a flame 24 that extends up toward the tray 16. The tray 16 is typically filled with water that is heated by the flames 24 of the heating elements 18. The dishes 22 typically contain food which is heated by the water.

Figure 2:
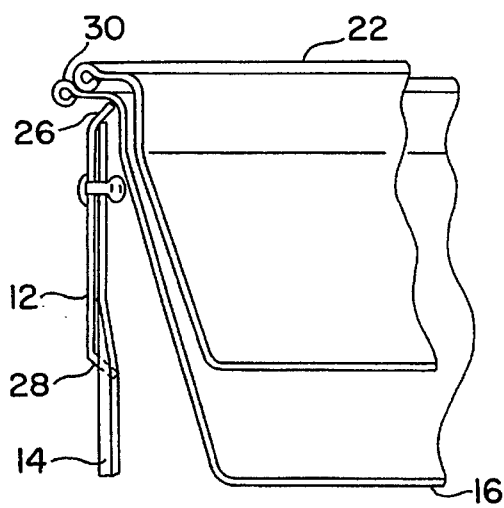
FIG. 2 is a sectional view of the assembly showing a water tray and food dish supported by a bended edge of a frame.
Figure 3:
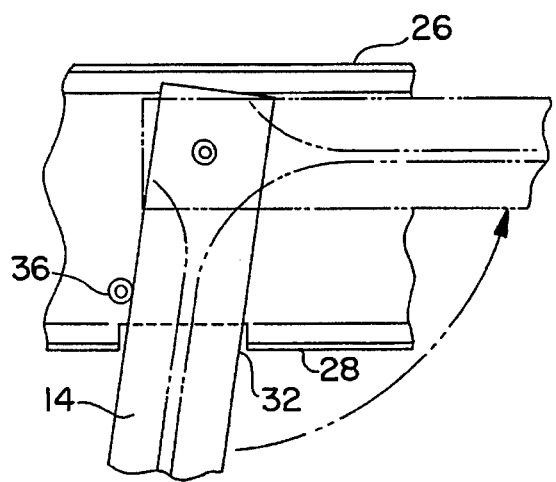
FIG. 3 is a sectional view of a leg of the frame.
Figure 4:
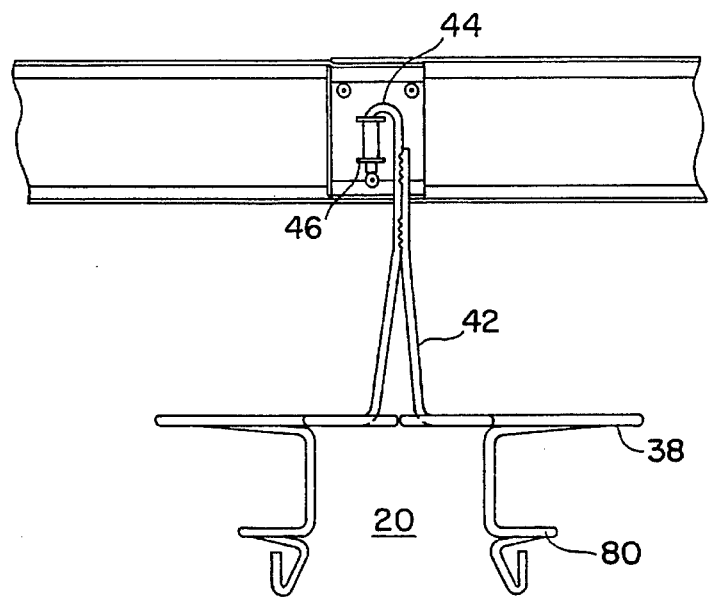
FIG. 4 is a front view of a ring subassembly of the chafing dish assembly.
Figures 6, 7:
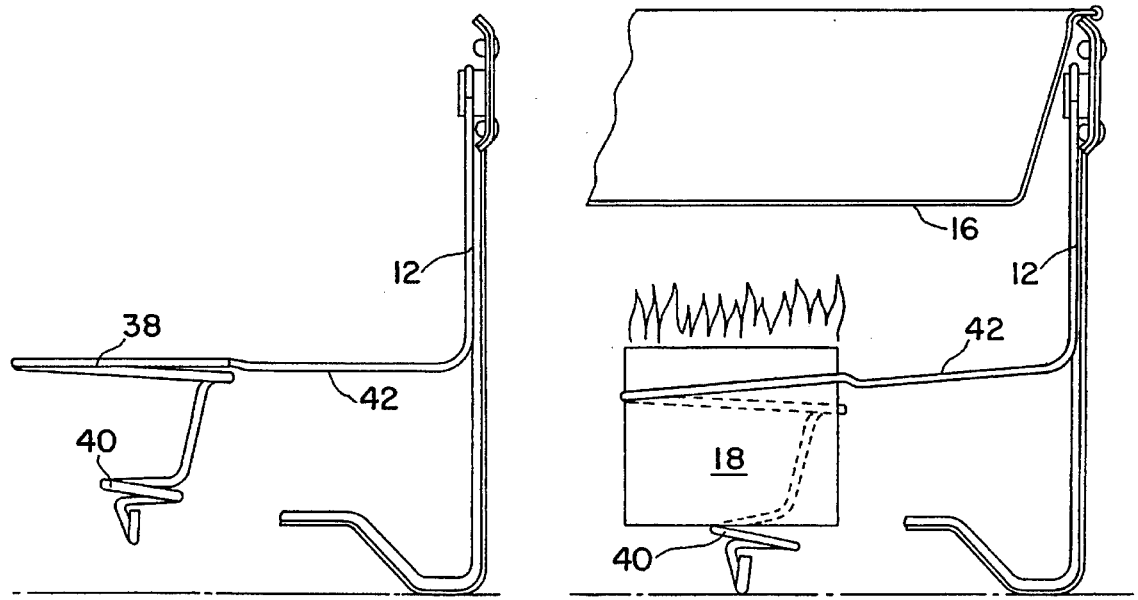
FIG. 6 is a side view of the ring subassembly in an undeflected position.
FIG. 7 is a side view of the ring subassembly in a deflected position.

As shown in FIGS. 2 and 3, the frame 12 has a top bent edge 26 and a bottom bent edge 28. The top bent edge 26 provides a ledge for the outer lips 30 of the tray 16 and dishes 22. The top bent edge 26 provides a large support area that allows the tray 16 to be easily placed onto the frame 12. The bottom bent edge 28 has a plurality of slots 32 that receive the legs 14. The legs 14 rotate about rivets 34. The legs 14 are captured by the bottom bent edge 28 and stops 36 when rotated into an unfolded position. The leg members 14 can be moved to a folded position by deflecting the legs 14 away from the frame 12 and rotating the same as indicated by the arrow in FIG. 3. Rotating the legs 14 into the folded position allows the assembly to be more easily packaged and stored.

As shown in FIG. 4-7, the ring subassembly 20 has a pair of large rings 38 that capture the heating elements 18 and a pair of smaller rings 40 that support the heating elements 18. The rings 38 and 40 are cantilevered by a pair of wires 42 which have a hook 44 that extends into a corresponding slot 46 of the frame 12. The hook 44 and slot 46 provide a pivot point about which the ring subassembly 20 is rotated relative to the frame 12. The pivoting subassembly allows the heating elements 18 to be lighted and then rotated back under the tray 16.

The weight of the heating elements 18 deflect the ring subassembly 20 in a downward direction away from the tray 16. As the fuel within the heating elements 18 become expended, the flames 24 become smaller and the elements 18 become lighter. The reduction in the weight of the heating elements 18 reduces the deflection of the ring subassembly 20, such that the assembly 20 moves in an upward direction toward the tray 16 as indicated by the arrow in FIG. 7. The movement of the ring subassembly 20 moves the decreasing flame into closer proximity with the tray 16, wherein the net result is a more uniform heating of the water and the food.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A chafing dish assembly, comprising:

a frame that has a bent top edge, and a bent bottom edge which has a plurality of slots;

a pair of legs that are pivotally connected to said frame and rotated between a retracted position and an unfolded position, said legs being located within said frame slots and captured by said bent bottom edge when in the unfolded position;

a tray that is supported by said bent top edge of said frame; and, a ring that extends from said frame.

2. The assembly as recited in claim 1, wherein said ring is deflected by a heating element that is supported by said ring.

3. The assembly as recited in claim 1, wherein said ring is pivotally connected to said frame.

4. The assembly as recited in claim 1, further comprising a pair of dishes located within said tray.

* * * * *